(No Model.) 2 Sheets—Sheet 1.
T. CHARLTON.
AUGER OR BORING TOOL.
No. 461,666. Patented Oct. 20, 1891.
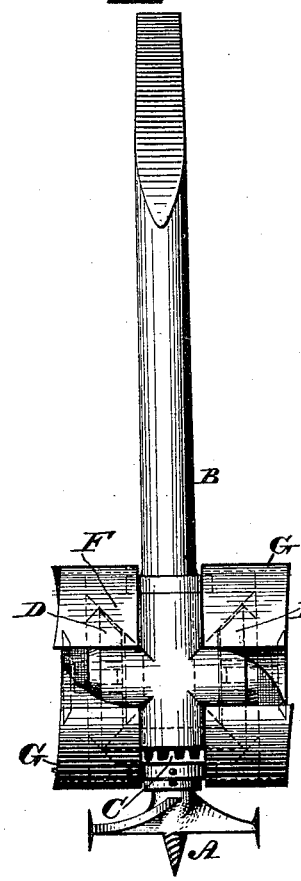
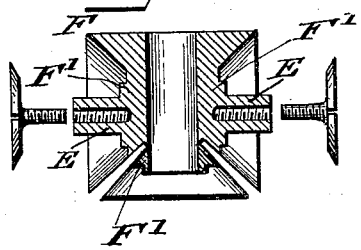
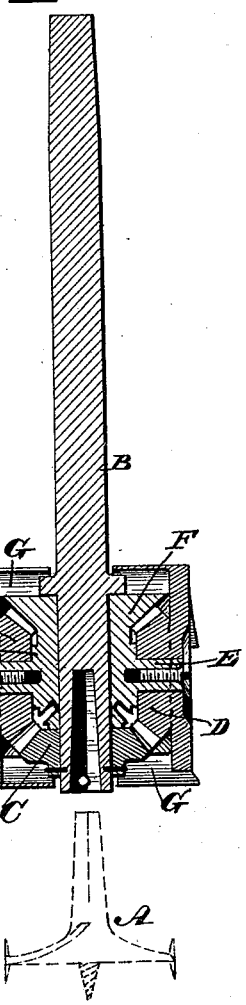
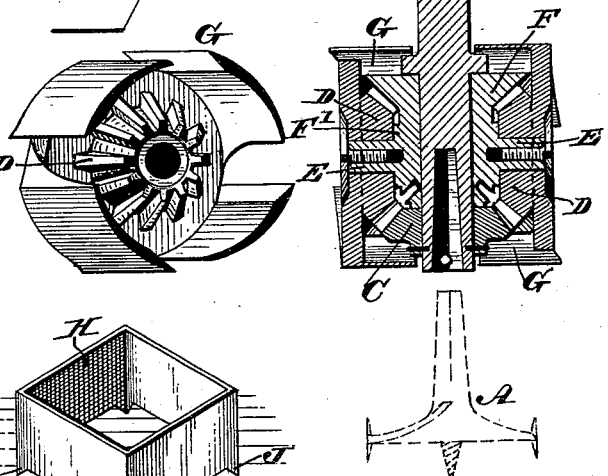
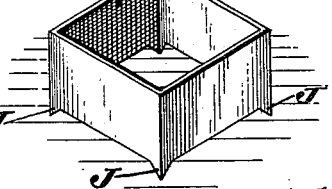
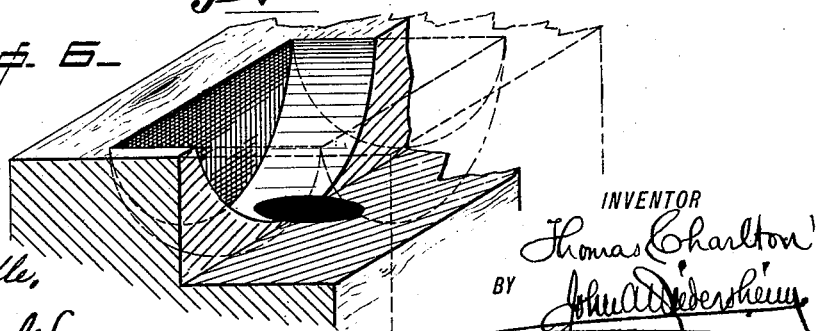
WITNESSES:
L. Douville,
P. H. Dagle
INVENTOR
Thomas Charlton
BY John A. Wiedersheim
ATTORNEY.

(No Model.) 2 Sheets—Sheet 2.

T. CHARLTON.
AUGER OR BORING TOOL.

No. 461,666. Patented Oct. 20, 1891.

WITNESSES:
L. Douville,
P. H. Cagle.

INVENTOR
Thomas Charlton
BY John A. Wiedersheim
ATTORNEY.

UNITED STATES PATENT OFFICE.

THOMAS CHARLTON, OF PHILADELPHIA, PENNSYLVANIA.

AUGER OR BORING-TOOL.

SPECIFICATION forming part of Letters Patent No. 461,666, dated October 20, 1891.

Application filed January 6, 1890. Serial No. 335,973. (No model.)

*To all whom it may concern:*

Be it known that I, THOMAS CHARLTON, a citizen of the United States, residing in the city and county of Philadelphia, State of Pennsylvania, have invented a new and useful Improvement in Augers or Boring-Tools, which improvement is fully set forth in the following specification and accompanying drawings.

My invention consists of an auger or boring-tool for cutting or forming an angular opening in wood, metal, &c., such as will be more fully hereinafter set forth.

Figure 7:
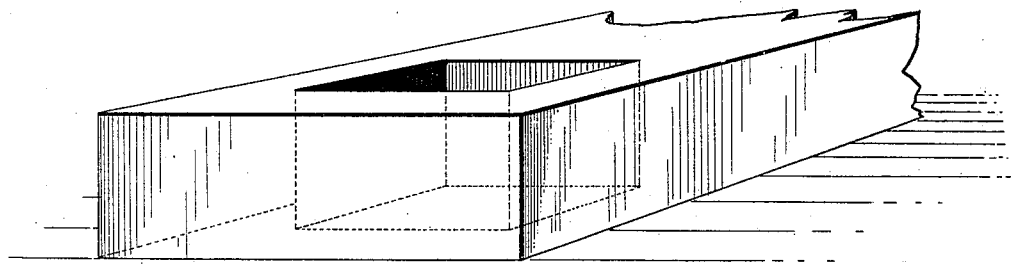
Figure 8:
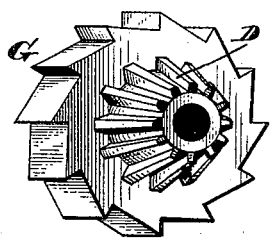
Figure 9:
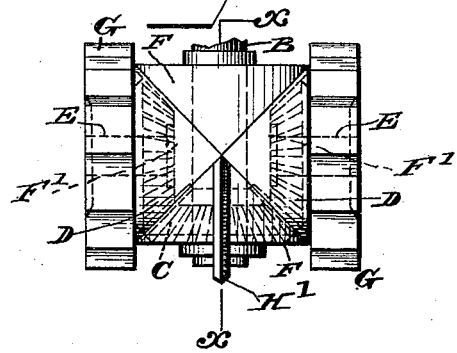
Figure 10:
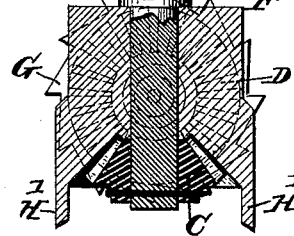
Figure 11:
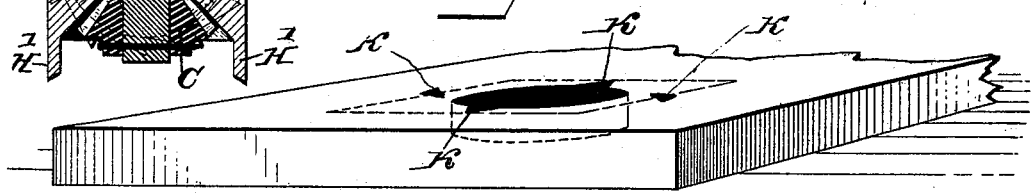

Figure 1 represents a side elevation of an auger embodying my invention. Fig. 2 represents a longitudinal section thereof. Fig. 3 represents a section of a detached portion thereof. Fig. 4 represents a perspective view of one of the rotary cutters and connected gear. Fig. 5 represents a guide for the auger or tool. Figs. 6, 7, and 11 represent perspective views of the work accomplished. Fig. 8 represents a perspective view of another form of cutter. Fig. 9 represents a side elevation thereof. Fig. 10 represents a section on line $x\ x$, Fig. 9.

Similar letters of reference indicate corresponding parts in the several figures.

Referring to the drawings, A designates an auger-bit or boring-tool, which is connected with the stock B, whereby rotation may be imparted to the same.

C designates a bevel-pinion, which is secured to the end of stock B, adjacent to the bit A, and meshes with bevel-pinions D, which are mounted on journals E, the latter projecting from a head F, which encircles the stock B, and is secured thereto in such manner that the stock may rotate without moving longitudinally therein. The said head is constructed with a series of bearing-surfaces F' for the pinions D, to thereby keep said pinions in proper position, said journals E being integral with said bearings F'. Formed with or secured to the pinions D are cutters G, the same consisting of a series of blades whose cutting-edges extend substantially parallel with the axis of the said pinions nearly to the stock B, so as to cut out or gouge all the material between the path of the outer edge of the cutter and the opening formed by the boring-bit or auger.

The operation is as follows: A box H is located over the place to be bored, the tool is mounted in said box, and the bit is presented to the wood and rotated so as to enter the wood. The pinion C also rotates and operates the pinions D, whereby motion is imparted to the cutters G, the edges of which cut into the wood, and form an oblong semi-cylindrical opening therein. (See Fig. 6.) The tool is now withdrawn and turned at a right angle to the opening previously formed, and again presented to the wood and operated, whereby the boring is continued and the opening made square, as shown by the dotted lines Fig. 6. When the wood is bored through, the opening is as illustrated in Fig. 7. In order to guide the tool, I employ the aforesaid box H, which is provided with spurs J for penetrating the wood, whereby the box is prevented from slipping. The box is located over the place where the opening is to be formed, and the tool placed within said box and operated, the outer sides of the cutters being sustained and guided by the box, whereby the work is performed true and regular. When the tool is withdrawn for a new insertion, either to finish an opening or to begin a new one, the box is also detached from the wood and turned so that the tool will move therein, as before.

For guiding the tool in metal boring, the head F is formed with guide-pins H', adapted to fit in openings K, made in the piece of metal adjacent to the place the hole is to be formed, whereby the cutters are laterally sustained and guided while being bored. When two sides of the hole are formed, the tool is turned to bore the remaining sides, and the pins H' then caused to engage other openings K.

For boring bevels or dovetailed-shaped openings, the cutters may be set obliquely to the axis of the stock.

The wood-boring tool (shown by Figs. 1 to 6, inclusive) may or may not be used in connection with the box H. When not used with said box, the point of the starting-auger A is forced into the material in which the hole is to be bored, and when the cutters G reach the surface, the tool, which is held by the hand against the face of the material, is operated, so as to start a depression, the sides or walls of said depression then forming the guide. After a cut in one direction the tool may be removed and turned so as to cut in a direction at a right angle thereto. The tools shown in Figs. 8 to 11, inclusive, are provided with pins H', whereby the use of a box H is dispensed with.

Having thus described my invention, what I claim as new, and desire to secure by Letters Patent, is—

1. An auger having a stock carrying a boring-bit, a head in which said stock rotates, bevel gear-wheels mounted on journals secured to said head and having cutting-blades carried thereby, and spurs used with said device for securing it to the material in which the boring is done, said parts being combined substantially as described.

2. An auger having a stock carrying a boring-bit, a head in which said stock rotates, bevel gear-wheels mounted on journals secured to said head, cutting-blades secured to bevel gear-wheels, and a guiding-box in which said stock with bit and cutting-blades work, said box having means, substantially as described, for securing it to the material in which the boring is being done, said parts being combined substantially as described.

3. An auger having a stock carrying a boring-bit and provided with rotary cutter-blades having cutting-edges at right angles with the axis of the stock, in combination with a guiding-box in which said bit and blades operate, substantially as described.

4. An auger having a stock carrying a boring-bit and provided with a head in which said stock rotates, the said head having journals with bevel-wheels thereon meshing with a bevel-gear secured to the stock, cutting-blades secured to the bevel-wheels on the head and at right angles to the axis of the stock, and a guiding-box in which the bit and cutting-blades work, said guiding-box having spurs, said parts being combined substantially as described.

THOMAS CHARLTON.

Witnesses.
JOHN A. WIEDERSHEIM,
A. P. JENNINGS.